United States Patent [19]

Liu

[11] Patent Number: 5,862,138
[45] Date of Patent: Jan. 19, 1999

[54] ADAPTIVE ROUTING IN A MULTIPLE NETWORK COMMUNICATION SYSTEM

[75] Inventor: Frank Feng Liu, Kanata, Canada

[73] Assignee: Northern Telecom Limited, Montreal, Canada

[21] Appl. No.: 678,595

[22] Filed: Jul. 15, 1996

[51] Int. Cl.$^6$ ........................................................ H04J 3/02
[52] U.S. Cl. .................................................. 370/406
[58] Field of Search .................................. 370/400, 401, 370/402, 403, 404, 405, 406, 407, 408, 409, 235, 236, 412, 413, 414, 415, 416, 417, 351, 389, 390; 375/259, 260

[56] References Cited

U.S. PATENT DOCUMENTS

| | | | |
|---|---|---|---|
| 5,257,258 | 10/1993 | Birman et al. | 370/413 |
| 5,455,820 | 10/1995 | Yamada | 370/413 |
| 5,493,566 | 2/1996 | Ljungberg et al. | 370/413 |
| 5,566,179 | 10/1996 | Kobayashi | 370/403 |

OTHER PUBLICATIONS

Title: Applications of Photonic Technology. Authors: Feng Liu and Mohsen Kavehrad. Chapter Title: *Multi–Dual Ring Connected Shuffle Network—A Better architecture for WAN*. Place of Pub. : New York, United States. pp. 61–65. Date: 1995 (month not known).

Title: Institute of Electrical and Electronics Engineers Network. Title of Article: *An Overview of Lightwave Packet Networks*. Authors: Anthony S. Acampora and Mark J. Karol. Place of Pub. : United States. pp. 29–40. Jan. 1989.

Title: AT&T Technical Journal. Authors: Anthony S. Acampora, Mark J. Karol and Michael G. Hluchyj. Title of Article: *Terabit Lightwave Networks: The Multihop Approach*. Place of Pub: United States. pp. 21–34. Nov. 1987.

Title: Globecom '91. Authors: Arunabha Sen and Pradip Maitra. Title of Article: *A Comparative Study of Shuffle–Exchange, Manhattan Street and Supercube Network for Lightwave Applications*. Place of Pub. : United States. pp. 1849–1854. Jan. 1991.

Title: Institute of Electrical and Electronics Engineers Journal on Selected Areas in Communications vol. 9. No. 7. Authors: Mark J. Karol and Salman Z. Shaikh. Title of Article: *A Simple Adaptive Routing Scheme for Congestion Control in ShuffleNet Multihop Lightwave Networks*. Place of Pub: United States. pp. 1040–1050. Sep. 1991.

Title: Journal of Lightwave Technology, vol. 9. No. 10. Authors: Michael G. Hluchyj and Mark J. Karol. Title of Article: *ShuffleNet : An Application of Generalized Perfect Shuffles to Multihop Lightwave Networks*. Place of Pub: United States. pp. 1386–1397. Oct. 1991.

Title: Institute of Electrical and Electronics Engineers Journal on Selected Areas in Communications vol. 6. No. 7. Authors: Martin Eisenberg and Nader Mehravari. Title of Article: *Performance of the Multihop Lightwave Network Under Nonuniform Traffic*. Place of Pub: United States. pp. 1063–1077. Aug. 1988.

Title: Photonic Technology. Authors: Feng Liu and Mohsen Kavehrad. Title of Chapter: *Multi–Dual Ring Connected Shuffle Network—A Better Architecture For WAN*. Place of Pub: New York, United States. pp: Article submission. Jan. 1994.

(List continued on next page.)

*Primary Examiner*—Huy D. Vu

[57] ABSTRACT

A method and apparatus for routing data packets from a current network node toward a destination node where the current node and the destination node are connected to first and second networks in a multiple network communication system. The method involves determining the destination node of the data packet, determining which of a plurality of outputs connected to the first and second networks are suitable to advance the data packet toward the destination node, determining queue lengths of output buffers associated with respective outputs of the plurality of outputs and forwarding the data packet to an output buffer having the least queue length, for transmission over a network to which the output associated with the output buffer is connected.

53 Claims, 8 Drawing Sheets

OTHER PUBLICATIONS

Title: Journal of Lightwave Technology, vol. 9, No. 10. Authors: Mohsen Kavehrad and Mahmoud Tabiani. Title of Article: *A Selective–Broadcast Passive Star Coupler for Self–Routing Dense Wavelength Division Multiplexed Optical Networks*. Place of Pub; USA pp. 1278–1288. Oct. 1991.

Title: Institute of Electrical and Electronics Engineer Catalog No. 93CH3288–8. Authors: Feng Liu and Mohsen Kavehrad. Title of Article: *Symmetrically Multi–Connected Optical WAN Network Architectures: Multi–Dual Ring Connected and Multi–Shuffle Connected Shuffle Networks*. Place of Pub: USA. May 1993.

Destination ring address     3     $a^d = 3$
            shuffle address  7     $b^d = 7$ Current ring address         2     $\hat{a} = 2$
        shuffle address      2     $\hat{b} = 2$

PART 1

(122)  $\hat{a} = a^d$          :  2 = 3 ?           No, go to 126

(126)  $a^d - \hat{a} > 0$      :  3 - 2 > 0 ?       Yes, go to 128

(128)  $|a^d - \hat{a}| \le M/2$  :  $|3 - 2| \le 4/2$ ?  Yes → clockwise, go to 130

(130)  $a^{NEXT} = \hat{a} + 1$ :  2 + 1 = 3         $a^{NEXT} = 3$ (134)                                                Ring Register = 3

PART 2

(150)  $\hat{b} = b^d$          :  2 = 7 ?           No, go to 154

$\hat{c} = \text{int } \hat{b}/p^k$  :  int $2/2^2$ = int 2/4 = 0   ∴ $\hat{c} = 0$ $\hat{r} = \hat{b} \bmod p^k$  :  2 mod $2^2$ = 2 mod 4     ∴ $\hat{r} = 2$ (154)  $c^d = \text{int } b^d/p^k$  :  int 7/4 = 1                  ∴ $c^d = 1$ $r^d = b^d \bmod p^k$   :  7 mod $2^2$ = 1              ∴ $r^d = 3 = 011b$ (156)  $\hat{r} = 10b$ (158)  $c^{NEXT} = (\hat{c} + 1) \bmod k = (0 + 1) \bmod 2 = 1$     ∴ $c^{NEXT} = 1$ (160)  D = k = 2

(162)  10 shiftleft 0X; X = Bit D - 1 = (2 - 1) = 1; Bit 1 is 1  ∴ $r^{NEXT} = 01$ (164)  $b^{NEXT} = c^{NEXT} \cdot p^k + r^{NEXT} = 1 \cdot 2^2 + 1 = 5$   ∴ $b^{NEXT} = 5$

Shuffle Register = 5

Possible Address (3,2) from Part 1, ie. to Ring 3 or (2,5) from Part 2, ie. to Shuffle 5

FIG. 8

ADAPTIVE ROUTING IN A MULTIPLE NETWORK COMMUNICATION SYSTEM

FIELD OF THE INVENTION

This invention relates to routing data packets in multiple network communications systems and more particularly to a method and apparatus for selecting a data transmission path enroute to a destination node based on queue lengths associated with available transmission paths.

BACKGROUND OF THE INVENTION

With the increasing use of optical fibre networks for multi-user Wide Area Networks (WAN) a vast amount of bandwidth is available. To take advantage of this bandwidth, a perfect shuffle network topology using wavelength division multiplexing and a multi-hop approach, has been proposed. Unfortunately, the graph connectivity of such a network is homogeneous while the communications traffic pattern for wide area networks is not. Therefore, the perfect shuffle network architecture is not suitable for WANs. The perfect shuffle network architecture, however, has been improved using a multi-dashed dual ring connected shuffle network. It has been shown that this type of network architecture can provide better performance for a WAN environment under uniform and nonuniform traffic patterns. With such a network architecture, each node has a choice of forwarding traffic on the basis of perfect shuffle network routing algorithms or ring network algorithms.

Fixed routing algorithms used in a perfect shuffle network can be effective when the traffic pattern is uniform. However, in practice, a uniform source-destination traffic pattern is unlikely in high capacity networks where there are a few nodes which generate (or sink) most of the traffic. Some nonuniform traffic patterns can cause data packets to pass through only a small subset of channels, creating overloading on such channels. In the event of a link failure between nodes on the network, a data packet may be prevented from being delivered to its destination. Efforts have been made, however, to predict traffic patterns and expected failure conditions allowing fixed routing algorithms to deal with such problems imposed by the limitations of the network.

Network conditions, such as traffic pattern and failure conditions cannot reliably be predicted in advance and, therefore, it would be desirable to make routing decisions at each node based on current network conditions. Thus, at any given instant, data packets can be routed throughout the network in the most efficient manner.

SUMMARY OF THE INVENTION

In accordance with one aspect of the invention, there is provided a method of routing data packets from a current network node toward a destination node where the current node and the destination node are connected to first and second networks in a multiple network communication system, the method including the steps of:

a) determining the destination node of the data packet;

b) determining which of a plurality of outputs connected to the first and second networks are suitable to advance the data packet toward the destination node;

c) determining queue lengths of output buffers associated with respective outputs of the plurality of outputs; and d) forwarding the data packet to an output buffer having the least queue length, for transmission over a network to which the output associated with the output buffer is connected.

Preferably, the method includes the step of determining first and second address components of possible next nodes toward the destination node in the first and second networks and the step of determining whether or not first and second address components of a destination address of the destination node are equal to respective corresponding components of the current address and if so, making the data packet available to the current node.

Preferably, the method includes the step of receiving at one of a plurality of inputs connected to respective networks a data packet addressed to the destination node.

Preferably, the method includes the step of reading a header portion of the data packet to determine the destination node.

Preferably, the method includes the steps of determining first and second address components of possible next nodes toward the destination node in the first and second networks, determining whether or not a first address component and a second address component of a destination address of the destination node are equal to respective corresponding components of the current address and if so, making the data packet available to the current node, determining whether or not the first address component of the destination address is equal to the first address component of the current node and if so, transmitting the data packet on the second network, and determining whether or not the second address component of the destination address is equal to the second address component of the current node and if so, transmitting the data packet on the first network.

In accordance with another aspect of the invention, there is provided a method of routing a data packet toward a destination node in a multi-dual ring connected shuffle network including a ring network and a shuffle network, the destination node having a destination address having a ring address component and a shuffle address component, the method including the steps of:

determining the destination node of the data packet;

determining which of a plurality of outputs connected to the ring and shuffle networks are suitable to advance the data packet toward the destination node;

determining queue lengths of output buffers associated with outputs of the plurality of outputs; and forwarding the data packet to an output buffer having the least queue length, for transmission over the network to which the output associated with the output buffer is connected.

Preferably, the method includes the step of determining the possible next nodes toward the destination node in the ring network and in the shuffle network.

The method may include the step of determining a preferred direction in which to transmit the data packet over the ring network to advance the data packet toward the destination node.

Preferably, the method includes the steps of determining whether or not the current node is the destination node and if so, making the data packet available to the current node, determining whether or not the ring address component of the destination address is equal to a ring address component of the current node and if so, transmitting the data packet on the shuffle network, determining whether or not the shuffle address component of the destination address is equal to a shuffle address component of the current node and if so, transmitting the data packet on the ring network and determining whether or not the ring address component and the shuffle address components of the destination address are equal to respective corresponding components of the current address and if so, making the data packet available to the current node.

In accordance with another aspect of the invention, there is provided an apparatus for routing data packets from a current network node toward a destination node in a multiple network communication system, the apparatus including a register for receiving the data packet, outputs connected to respective networks, output buffers associated with respective outputs, the output buffers being operable to hold respective queues of data packets ready for transmission over respective networks, a queue length determiner for determining queue lengths of the respective queues of data packets, and a copier for copying the data packet from the register to an output buffer having the least queue length.

Preferably, the apparatus includes a node determiner for determining possible next nodes on respective networks, to which the data packet can be advanced toward the destination node and for determining whether or not the current network node is the destination node.

Preferably, the apparatus includes a transmitter for transmitting the data packet on at least one of the networks.

Preferably, the multiple network communication system includes first and second networks and the apparatus includes an address determiner for determining first and second address components of possible next nodes toward the destination node in the first and second networks. Preferably, the address determiner is also operable to determine whether or not the first address component and the second address component of the destination address are equal to respective corresponding components of the current address, to determine whether or not the first address component of the destination address is equal to a first address component of the current node and if so, cause the data packet to be transmitted on the second network, and to determine whether or not the second address component of the destination address is equal to the second address component of the current node and if so, cause the data packet to be transmitted on the first network.

Preferably, the apparatus includes a header reader for reading a header portion of the data packet to determine the destination node.

Preferably, the apparatus includes a central processing unit programmed to perform the functions of the queue length determiner, and the copier and includes a central processing unit programmed to perform the functions of the node determiner and programmed to determine first and second address components of possible next nodes toward the destination node in the first and second networks, determine whether or not the first address component and the second address component of the destination address are equal to respective corresponding components of the current address, determine whether or not the first address component of the destination address is equal to a first address component of the current node and if so, cause the data packet to be transmitted on the second network, and determine whether or not the second address component of the destination address is equal to the second address component of the current node and if so, cause the data packet to be transmitted on the first network.

The apparatus may include a plurality of inputs connected to respective networks for receiving a data packet addressed to the destination node.

In accordance with another aspect of the invention, there is provided an apparatus for routing a data packet toward a destination node in a multi-dual ring connected shuffle network including a ring network and a shuffle network, the data packet having a ring address component and a shuffle address component, the apparatus including, a register for receiving the data packet, outputs connected to the ring network, output buffers associated with respective outputs, the output buffers being operable to hold respective queues of data packets ready for transmission over the ring network and the shuffle network respectively, a queue length determiner for determining queue lengths of the respective queues of data packets and a copier for copying the data packet from the register to an output buffer having the least queue length.

Preferably, the apparatus includes a node determiner for determining possible next nodes on the ring network and on the shuffle network to which the data packet can be advanced toward the destination node and preferably, the node determiner is operable to determine a preferred direction in which to transmit the data packet over the ring network to advance the data packet toward the destination node. Also preferably, the node determiner is operable to determine whether or not the current node is the destination node and if so, make the data packet available to the current node.

Preferably, the apparatus also includes an address determiner for determining ring and shuffle address components of possible next nodes toward the destination node in the ring network and in the shuffle network.

Preferably, the apparatus includes a receive register and preferably, the address determiner is operable to determine whether or not the ring component and the shuffle component of the destination address are equal to respective components of the current address and preferably, the copier is operable to copy the data packet to the receive register for use by the current node when the ring and shuffle components of the destination address are equal to respective components of the current address.

Preferably, the apparatus includes a header reader for reading a header portion of the data packet to determine the destination node.

The apparatus may include first and second inputs in communication with the ring network and the shuffle network respectively, for receiving a data packet addressed to the destination node.

Preferably, the apparatus includes a central processing unit programmed to perform the functions of the queue length determiner and copier, and preferably the central processing unit is operable to perform the functions of the node determiner and the address determiner and to determine ring and shuffle address components of possible next nodes toward the destination node in the ring and shuffle networks, determine whether or not the ring address component and the shuffle address component of the destination address are equal to respective corresponding components of the current address, determine whether or not the ring address component of the destination address is equal to a ring address component of the current node and if so, cause the data packet to be transmitted on the shuffle network, and determine whether or not the shuffle address component of the destination address is equal to the shuffle address component of the current node and if so, cause the data packet to be transmitted on the ring network.

The above method and apparatus provide an efficient way of routing data packets from a current network node toward a destination node in a multiple network communication system. The queue lengths of output buffers associated with respective outputs of the node provide feedback to the algorithm as to the state of the network. This allows the algorithm to adapt to network loading and network conditions such as link failure, thereby ensuring data transmission in an efficient manner. The invention provides a way of quickly dispersing packets away from congested portions of the overall network and provides a way of distributing network traffic over less busy channels without increasing the length of the transmission path. In addition, in a case of a network link failure, traffic is directed around trouble areas. As the maximum traffic intensity on each channel is decreased, the size of pre-allocated buffer at each network node can similarly be decreased. The above characteristics render the method and apparatus according to the invention suitable for optical network architectures. In particular, the above method and apparatus can be used in connecting together various metropolitan networks, each employing a shuffle net topology, where each metropolitan network is connected to another in a dual ring topology.

BRIEF DESCRIPTION OF THE DRAWINGS

In drawings which illustrate embodiments of the invention.

DETAILED DESCRIPTION

Figure 1:
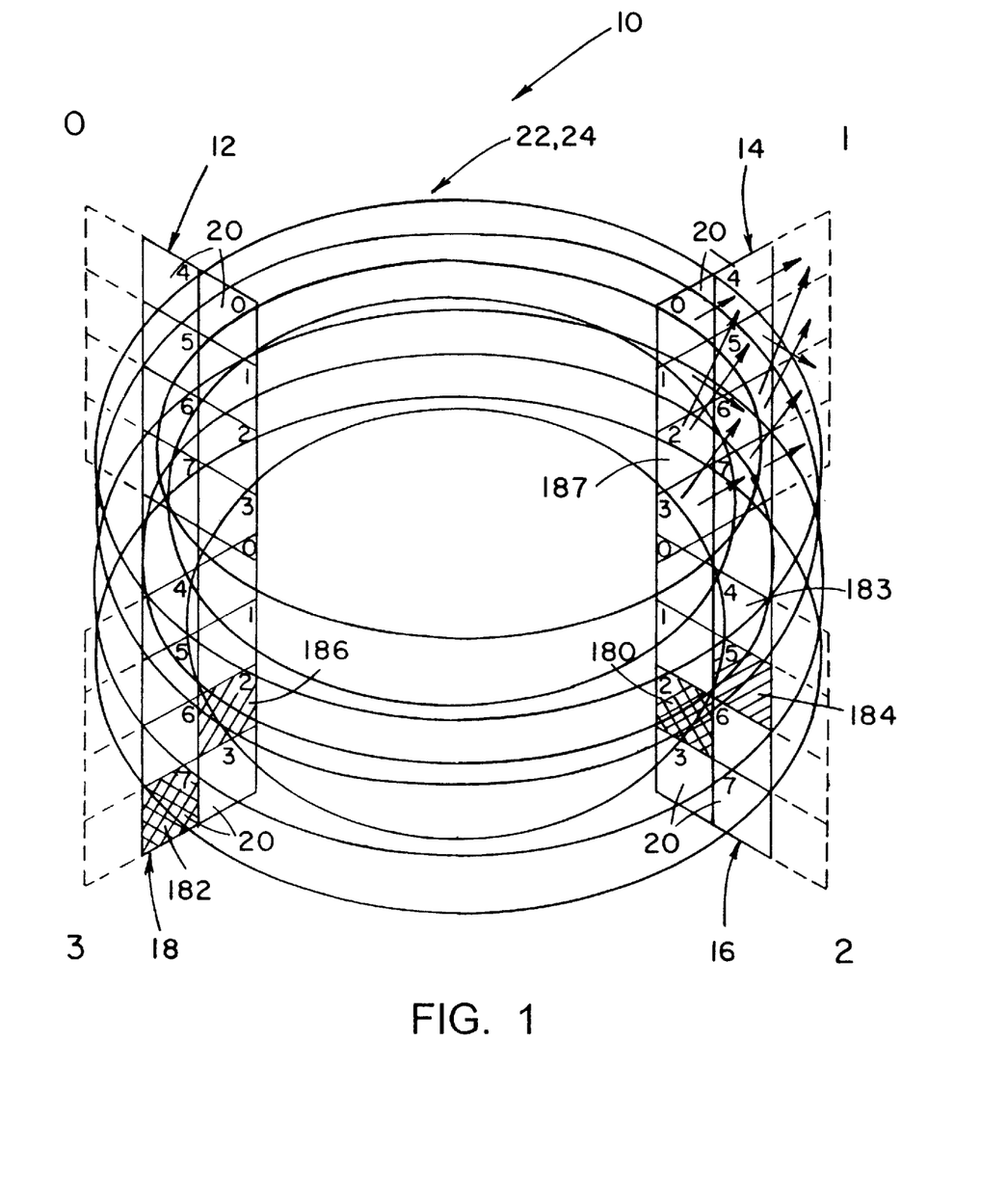
FIG. 1 is a schematic representation of a multiple network including a multi-dual ring connected shuffle network interconnected by nodes according to a first embodiment of the invention.

Referring to FIG. 1, a multi-dual ring connected shuffle (MDRCS) network is shown generally at 10. This network includes a plurality of perfect shuffle networks 12, 14, 16 and 18 each having a plurality of nodes 20. Each node 20 is connected to a corresponding node in another perfect shuffle network by first and second ring links only two of which are indicated at 22 and 24. Effectively, each of the ring links is considered to be part of a ring network and each of the perfect shuffle networks is considered to be a shuffle network. The shuffle networks 12, 14, 16 and 18 are arranged and numbered clockwise around the ring network. The numbering around the ring begins with the number 0 and increases to the number 3, in this embodiment. Shuffle network 12 therefore has ring address 0, shuffle net 14 has ring address 1, and so on.

Figure 2:
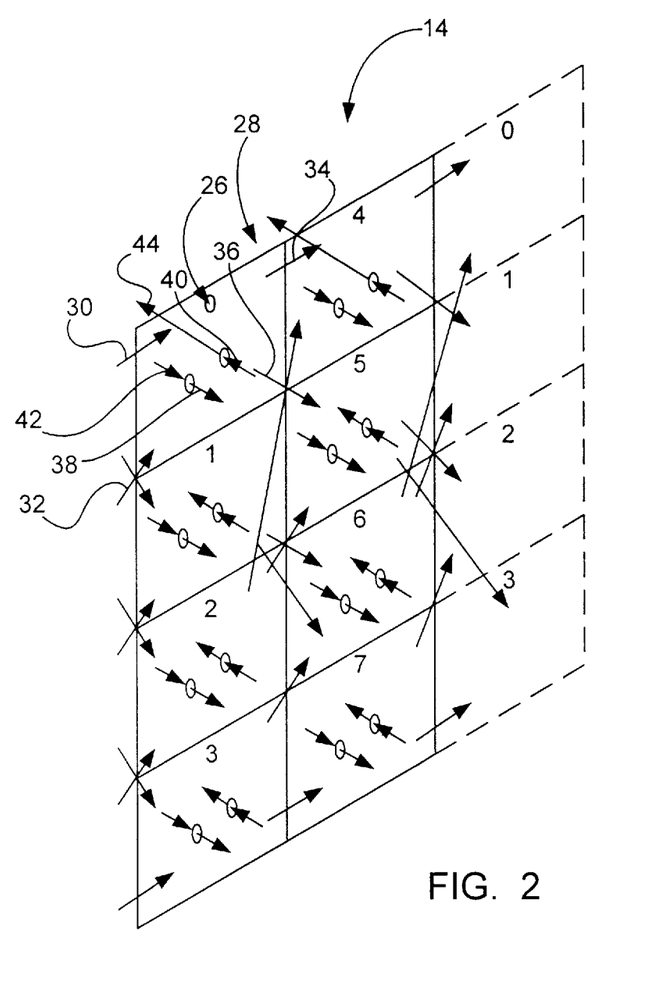
FIG. 2 is a schematic representation of nodes in a perfect shuffle network of FIG. 1 indicating inputs and outputs to adjacent node and their connectivity.

Referring to FIG. 2, each node 20 is identified by a number indicated at 26 and in the present embodiment, there are 8 nodes numbered 0 through 7 in each perfect shuttle network. Each node in the MDRCS network can therefore be uniquely identified by a node address having a ring component and a shuffle component.

Nodes transmitting on the ring network are operable to transmit data between nodes in a clockwise and counter-clockwise direction around the network. Nodes transmitting on the shuffle network are operable to transmit data to one of two nodes as determined by conventional shuffle net routing algorithms.

Figure 3:
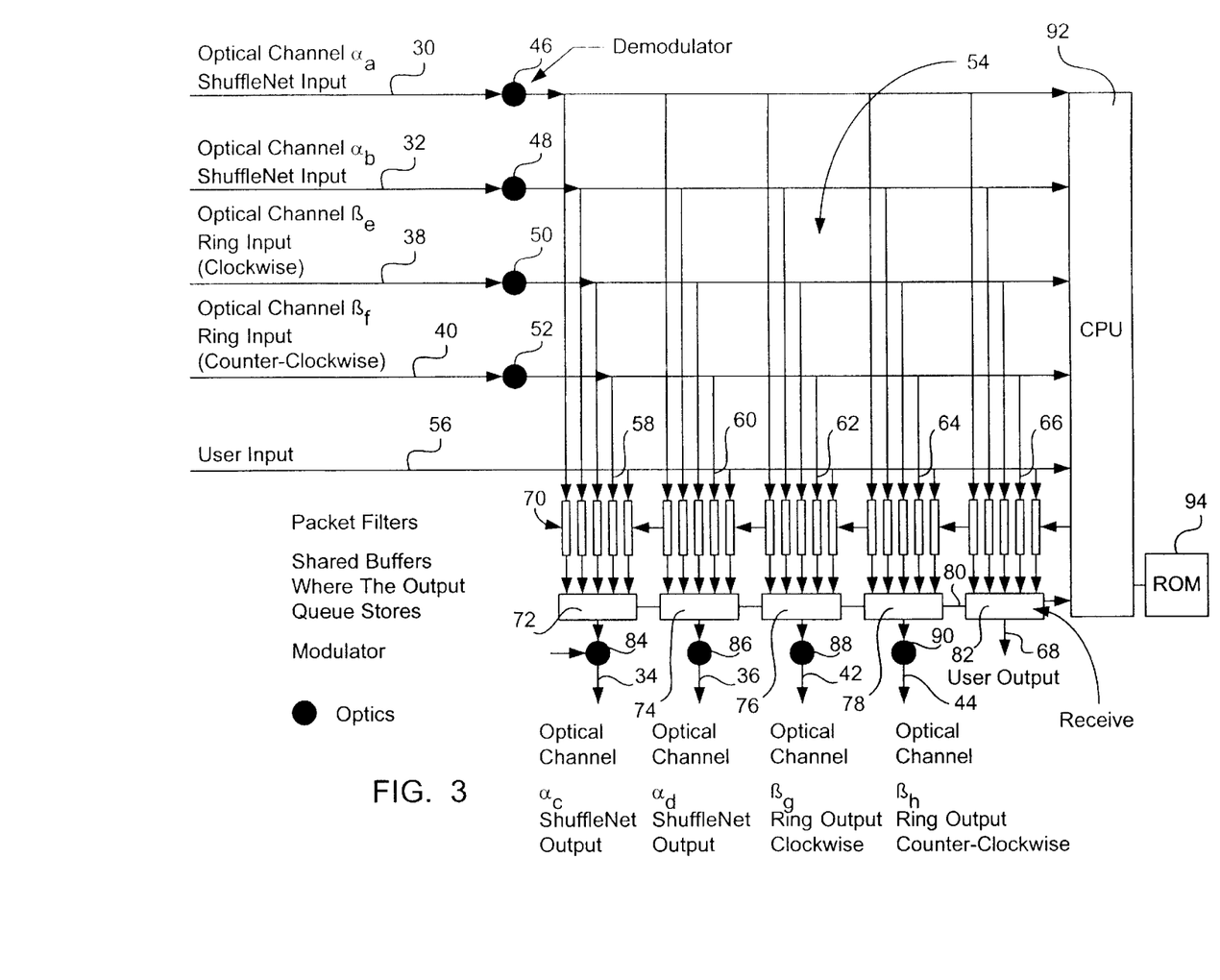
FIG. 3 is a block diagram of inputs and outputs of a network node according to the first embodiment of the invention.

Referring to FIG. 3, node 0, for example, is shown generally at 28 and includes first and second shuffle net inputs 30 and 32, first and second shuffle net outputs 34 and 36 first and second ring inputs 38 and 40 and first and second ring outputs 42 and 44.

Referring to FIG. 3, the inputs 30, 32, are connected to the shuffle network and the inputs 38 and 40 are connected to the ring network and are operable to receive a data packet addressed to a destination node. Each of the inputs 30, 32, 38 and 40 is connected through a respective demodulator 46, 48, 50 and 52 to a respective signal line, which together act as an internal bus, shown generally at 54. The internal bus 54 also includes a user input 56 for receiving data from a computer (not shown) which may be connected to the node.

Still referring to FIG. 3, the bus 54 is further connected to respective output stages 58, 60, 62, 64 and 66, the first output stage 58 being associated with the first shuffle net output 34, the second output stage 60 being associated with the second shuffle net output 36, the third output stage 62 being associated with the first ring output 42, the fourth output stage 64 being associated with the second ring output 44 and the fifth output stage 66 being associated with a user output signal line 68 which is connectable to a computer (not shown). In this embodiment therefore, each node is connected to two adjacent nodes on the ring network and two adjacent nodes on the same shuffle network. In the case of node 180 in FIG. 1, this node is connected to nodes 186 and 187 (having addresses 3,2 and 1,2, respectively) on the ring network which are accessible by sending data on the ring network in the clockwise and counter-clockwise directions respectively. In addition, node 180 is connected to nodes 183 and 184 (having addresses 2,4 and 2,5 respectively) on the same shuffle network as determined by the definition of a perfect shuffle network.

The relation between possible next nodes to which data may be sent and the output of the current node may thus be specified by a lookup table as follows.

TABLE 1

| Output | Accessible Node Address |
|--------|------------------------|
| 34 | 2, 4 |
| 36 | 2, 5 |
| 42 | 3, 2 (clockwise) |
| 44 | 1, 2 (counter-clockwise) |

A computer connected to the node is operable to supply data for network transmission via the user input line 56 and is operable to receive data from the networks via output line 68. Where the instant node is the destination node, a data packet received on any of the inputs is forwarded to the computer connected to the destination node by signal line 68. Similarly, data initiated at the node would be placed on the network via user input line 56.

Output Stages

Each output stage 58–66 is operable to receive data packets from the respective data lines in the data bus 54. Data packets received on the signal lines from the demodulators 46–52 are forwarded to respective packet filters shown generally at 70, which selectively enable the data packet to only be forwarded to a selected output 34–44 and 68. The packet filters of each output stage 58 are operable to forward a data packet to an output buffer 72, 74, 76 and 78 associated with the associated output 34, 36, 42 and 44. The fifth output stage 66 has packet filters which forward packets to a receive buffer 80 comprising a plurality of receive registers 82 readable by a computer via signal line 68.

Each of the output buffers 72 through 78 includes a plurality of registers which are operable to asynchronously receive data from the respective set of packet filters 70 associated with the associated output stage.

Output stages 58, 60, 62 and 64 further include respective modulators 84, 86, 88 and 90 which are operable to successively read registers in the respective output buffers in order to provide data packets at respective outputs 34, 36, 42 and 44, in a first in/first out (FIFO) manner.

Queues of Data Packets

It will be appreciated that each output stage 58 through 66 is operable to receive data packets from five different sources, these being inputs 30, 32, 38, 40 and 56. In a busy network, data may be received from these five sources faster than it can be presented at the outputs 34, 36, 42, 44 and 68 by the respective output stages 58, 60, 62, 64 and 66 and, therefore, the respective output buffers 72, 74, 76, 78 and 80 will accumulate data packets awaiting to be transmitted at respective outputs 34, 36, 42 and 44. In effect, this accumulation of data packets ready to be transmitted defines respective output queues of data packets ready for transmission over respective networks connected to respective outputs 34, 36, 42 and 44.

In a busy network, the number of registers of each output buffer 72, 74, 76, 78 and 80 holding respective queues of data packets ready for transmission defines the length of respective the output queue. For example, if each data packet includes 53 bytes, the number of 53-byte blocks occupied in the associated output buffer (buffer 72 for example) defines the output queue length. Each output buffer may, therefore, be thought of as a circular memory with an input pointer address and an output pointer address and wherein the queue length is defined by the difference between the input pointer address and the output pointer address. The difference between these two addresses for each output buffer 72 through 80 is determined and monitored by a central processing unit CPU 92. The CPU thus acts as a queue length determiner for determining queue lengths of output buffers associated with respective outputs connected to the ring network and the shuffle network respectively.

The CPU also monitors the CPU 92 and is also connected to the data bus 54 to determine when a data packet is being received on any of the five inputs. The CPU has outputs connected to respective packet filters 70 which direct respective packet filters to cause a received data packet to be forwarded to its associated output buffer 72 through 80.

The CPU is further connected to a read only memory (ROM) 94, in this case an Electrically Programmable Read Only Memory (EPROM) preprogrammed with instructions readable by the CPU 92, for directing the CPU to execute an adaptive routing algorithm to control the operation of the packet filters 70, to cause received data packets to be copied to output buffers 72 through 80 having the least queue length.

The routing algorithm, in conjunction with the CPU and the packet filters thus act as a copier for copying the data packet to the output buffer having the least queue length.

The CPU is further used to maintain the lookup table shown in Table 1 for correlating possible next node addresses with the outputs.

Figure 4:
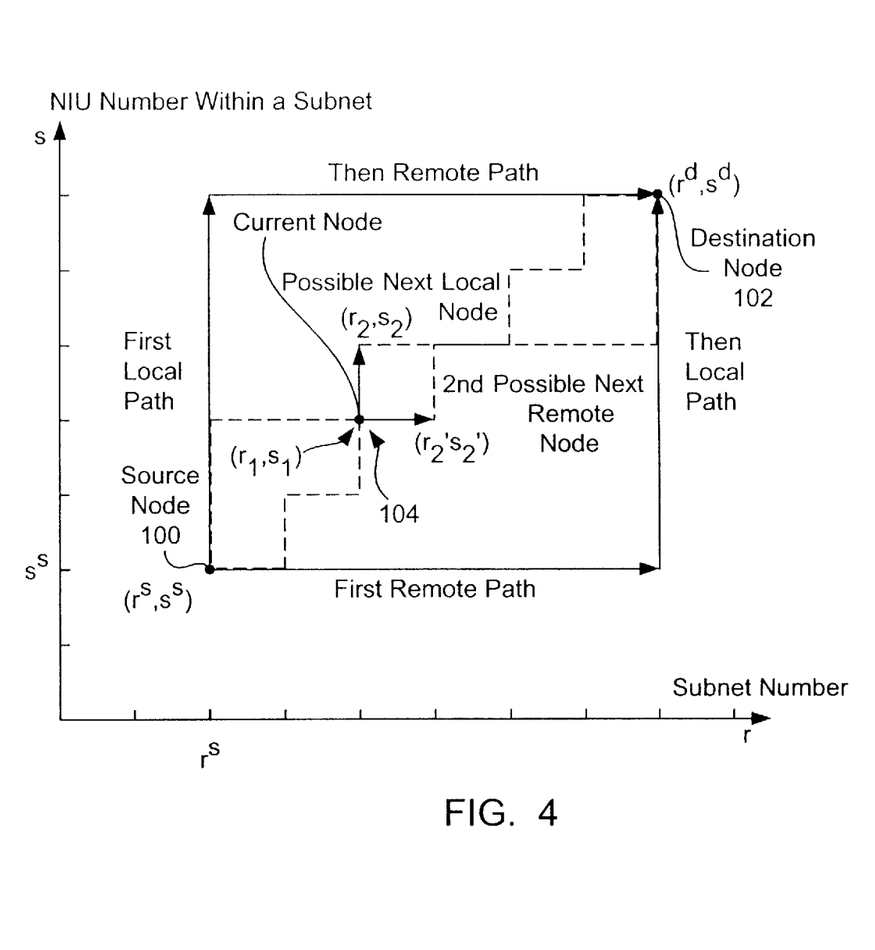
FIG. 4 is a graphical representation of possible data transmission paths associated with the outputs of the network node shown in FIG. 3.

Referring to FIG. 4, the general concept of the adaptive routing algorithm is to receive a data packet originating from a source node 100 destined for a destination node 102 and received at a current node 104 and to determine which of various possible next nodes enroute to the destination node to send the data packet. It will be appreciated that in the embodiment described, the possible remote nodes on the ring network will be counter-clockwise or clockwise around the ring. It will also be appreciated that within the shuffle network possible nodes will be determined by conventional techniques such as known shuffle net routing algorithms for determining the next node in a perfect shuffle network. Thus, in FIG. 4, $r_2 \, s_2$ designates the set of possible next nodes on the shuffle network and $r_2'$ and $s_2'$ designates the set of possible next nodes on the ring network. Generally, the adaptive routing algorithm evaluates possible next nodes and selects the node associated with the least queue length, from the two sets of possible nodes to advance the data packet toward the destination node 102 in the most efficient manner.

Adaptive Routing Algorithm

Figure 5:
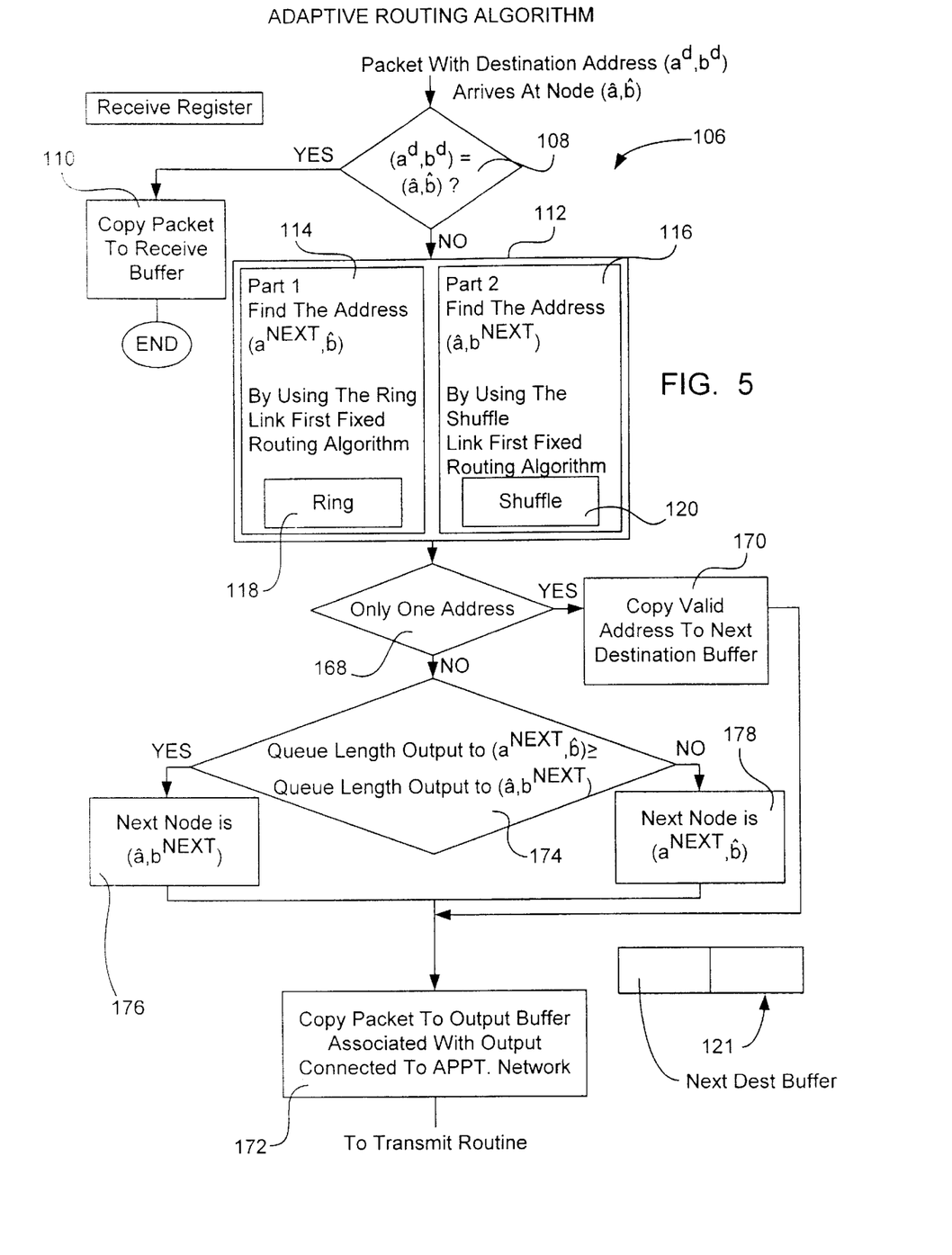
FIG. 5 is a flowchart representing an adaptive routing algorithm according to the first embodiment of the invention.

Referring to FIG. 5, the adaptive routing algorithm according to the first embodiment of the invention is shown generally at 106.

In FIG. 5, each data packet is considered to carry with it a destination address identified as $(a^d, b^d)$, where $a^d$ represents a ring component of the destination address and $b^d$ represents a local component thereof. Separate, identical adaptive routing algorithms are run by respective processors at each node on the network and each processor maintains its own table similar to Table 1 for correlating next node addresses to respective outputs. Therefore, the general description of the algorithm is described in connection with a data packet being received at a current node wherein the algorithm determines the next node to which the data packet is sent. The current node can be any node on the network.

Referring to FIGS. 3 and 5, upon receiving a data packet at any of the inputs 30, 32, 38, 40 and 56, the CPU 92 reads the data packet and determines the destination address $(a^d, b^d)$ from the packet. Further data packets received from other inputs while the algorithm according to FIG. 5 is being run on a first data packet are received in respective registers (not shown) maintained by the CPU 92 and a record is made of the order in which the data packets are received so that each can be dealt with in the order it was received.

With the destination address $(a^d, b^d)$ determined, the adaptive routing algorithm includes instructions for directing the CPU to execute a decision subroutine 108 for determining whether or not the destination address $(a^d, b^d)$ is equal to the address of the current node (a, b). The decision subroutine 108 in conjunction with the CPU thus act to determine whether or not the current node is the destination node. If the current node has the same address as the destination address, a copy subroutine 110 includes instructions to direct the CPU to cause the packet filters 70 associated with output stage 66 to forward the data packet to the receive buffer 80. The data packet can then be accessed by signal line 68 by the external computer. Thus in the case where the current node is the destination node, the data packet is transmitted over neither the ring network nor the shuffle network, but rather is made available for use at the current node. The decision subroutine 108, in conjunction with the CPU thus act as an address determiner for determining whether or not the ring address component and the shuffle address component of the destination address are equal to respective components of the current address.

Upon completion of the instructions associated with subroutine 110, the adaptive routing algorithm is completed and the next received data packet can be handled by the algorithm.

Returning back to subroutine 108, if the destination address ($a^d$, $b^d$) is not the address of the current node (á, b́), a next possible address subroutine 112 is run. This subroutine includes a first part shown generally at 114 and a second part shown generally at 116. The first part is described in connection with FIG. 6 and the second part is described in connection with FIG. 7. Still referring to FIG. 5, the first part 114 is associated with a ring register 118 which is operable to hold a ring address component (a) of the address of a next node to which the data packet may possibly be sent and the part two portion 116 communicates with a shuffle register 120 operable to contain a shuffle component (b) of the address of the next node to which the data packet may possibly be sent. Thus, in effect, the subroutine 112 is operable to load the ring and shuffle registers 118 and 120 with ring and shuffle components of possible next nodes on the ring and shuffle networks respectively.

Part One

Figure 6:
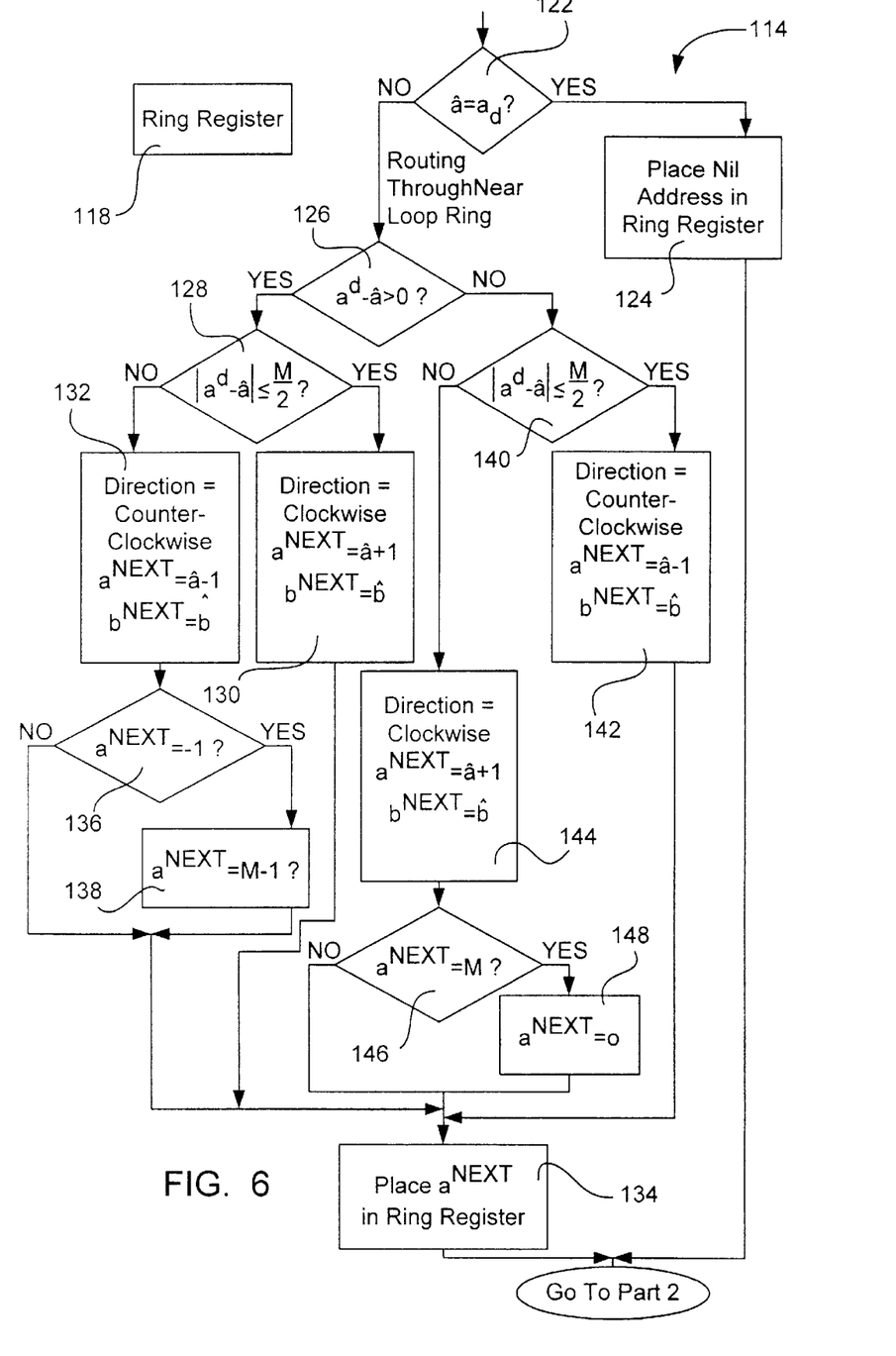
FIG. 6 is a flowchart representing a ring link algorithm according to the first embodiment of the invention.

Referring now to FIG. 6, the first part 114 of the adaptive routing algorithm includes a subroutine indicated generally at 122 which includes instructions for directing the processor to act as an address determiner for determining whether or not the ring address component $a^d$ of the destination address is equal to the ring address component á of the address of the current node. When this condition occurs, the processor is directed to subroutine 124 which includes instructions to cause the processor to place a nil address in the ring register 118 and to terminate the first part 114 of the algorithm. Processing then continues with the second part of the algorithm.

If the ring component (á) of the address of the current node is not equal to the ring component ($a^d$) of the destination address, a further subroutine 126 includes instructions operable to direct the processor to determine whether or not the ring address component ($a^d$) of the destination address is greater or less than the ring address component (á) of the current node.

If greater, subroutine 128 determines which direction to transmit the data packet on the ring network, clockwise or counter-clockwise. This is done in order to forward the data packet over the least distance to the next node.

The instructions associated with subroutine 128 determine whether or not the absolute value of the difference between the address component ($a^d$) of the destination address and the address component (á) of the current node is less than or equal to half of the number of nodes on the ring network (M/2). If so, then the direction in which to forward the data packet is clockwise and, if not, then the direction is counter-clockwise. Subroutine 130 includes instructions which direct the processor to handle the clockwise case whereupon the ring component ($a^{NEXT}$) of the address of the next node is deemed to be the ring component (á) of the current address plus one (á+1), ie., the next possible node is the next highest node on the ring network.

Similarly, subroutine 132 includes instructions for directing the processor to forward the data packet in the counter-clockwise direction, in which case the ring component ($a^{NEXT}$) of the address of the next node is equal to the ring component (á) of the current address minus one (á−1). In other words, the ring component address of the next node is one less than the ring component address of the current node.

In the case of the clockwise direction, handled by subroutine 130, a further subroutine 134 places the $a^{NEXT}$ address component in the ring register 118 and the first part 114 of the algorithm is completed. Processing then continues with the second part of the algorithm.

In the case where the direction is counter-clockwise, a further subroutine 136 includes instructions for determining whether or not the ring address component ($a^{NEXT}$) of the next node has a value less than node 0. This is done by determining whether or not ($a^{NEXT}$=1). If not, then processing is directed to subroutine 134 which places the ($a^{NEXT}$) address in the ring register 118.

If, on the other hand, the next node is less than node 0, a further subroutine 138 includes instructions to direct the CPU to cause the ring component of the next node to be one less than the ring component of the address of the highest node on the ring network. This value is then placed in the ring register as indicated by subroutine 134 and the first part 114 of the adaptive routing algorithm is completed. It will be appreciated that subroutines 136 and 138 solve the problem created by the highest numbered node on the ring network being adjacent the lowest numbered node.

Referring back to subroutine 126, if the difference between the ring component of the destination address and the current address is less than 0, processing is directed to a further subroutine 140 which includes instructions similar to subroutine 128, for determining what direction around the ring network to forward the data packet. In this case, if the absolute value of the difference between the ring component ($a^d$) of the destination address and the ring component (á) of the current address is less than or equal to half of the number of nodes on the ring, then the direction for transmission is deemed to be counter-clockwise and if the absolute value is greater, then the direction is deemed to be clockwise. Subroutine 128, in conjunction with the CPU therefore acts to determine a preferred direction in which to transmit the data packet over the ring network to advance the data packet toward the destination node.

Where the direction is deemed to be counter-clockwise, a further subroutine 142 includes instructions for directing the processor to determine ($a^{NEXT}$) to be one less than the ring address component (á) of the current node. The processor is then directed by subroutine 134 to place the ($a^{NEXT}$) value in the ring register and part one 114 of the adaptive routing algorithm is completed.

If the direction is deemed to be clockwise, a further subroutine 144 directs the processor to cause the ($a^{NEXT}$) value to be equal to the ring component of the current node address incremented by one.

A further subroutine 146 then determines whether or not the ($a^{NEXT}$) value is equal to the maximum number of nodes on the ring network and, if not, subroutine 134 places the ($a^{NEXT}$) value in the ring register and part one 114 of the adaptive routing algorithm is completed. If the ($a^{NEXT}$) value is equal to the maximum number of nodes, however, the ($a^{NEXT}$) value is forced to be 0 and subroutine 134 places this value in the ring register and part one 114 of the adaptive routing algorithm is completed. Again, it will be appreciated that subroutines 146 and 148 solve the problem created by the highest numbered node on the network being adjacent the lowest numbered node.

Still referring to FIG. 6, upon completion of part one 114 of the adaptive routing algorithm, the ring register 118 holds either a valid ring address component of a possible next node on the ring network or includes a null address in the case where the current node has the ring address component of the destination node. Also, upon completion of the first part of the algorithm, processing is directed to the send part of the algorithm, which is shown at 116 in FIG. 7.

Part Two

Figure 7:
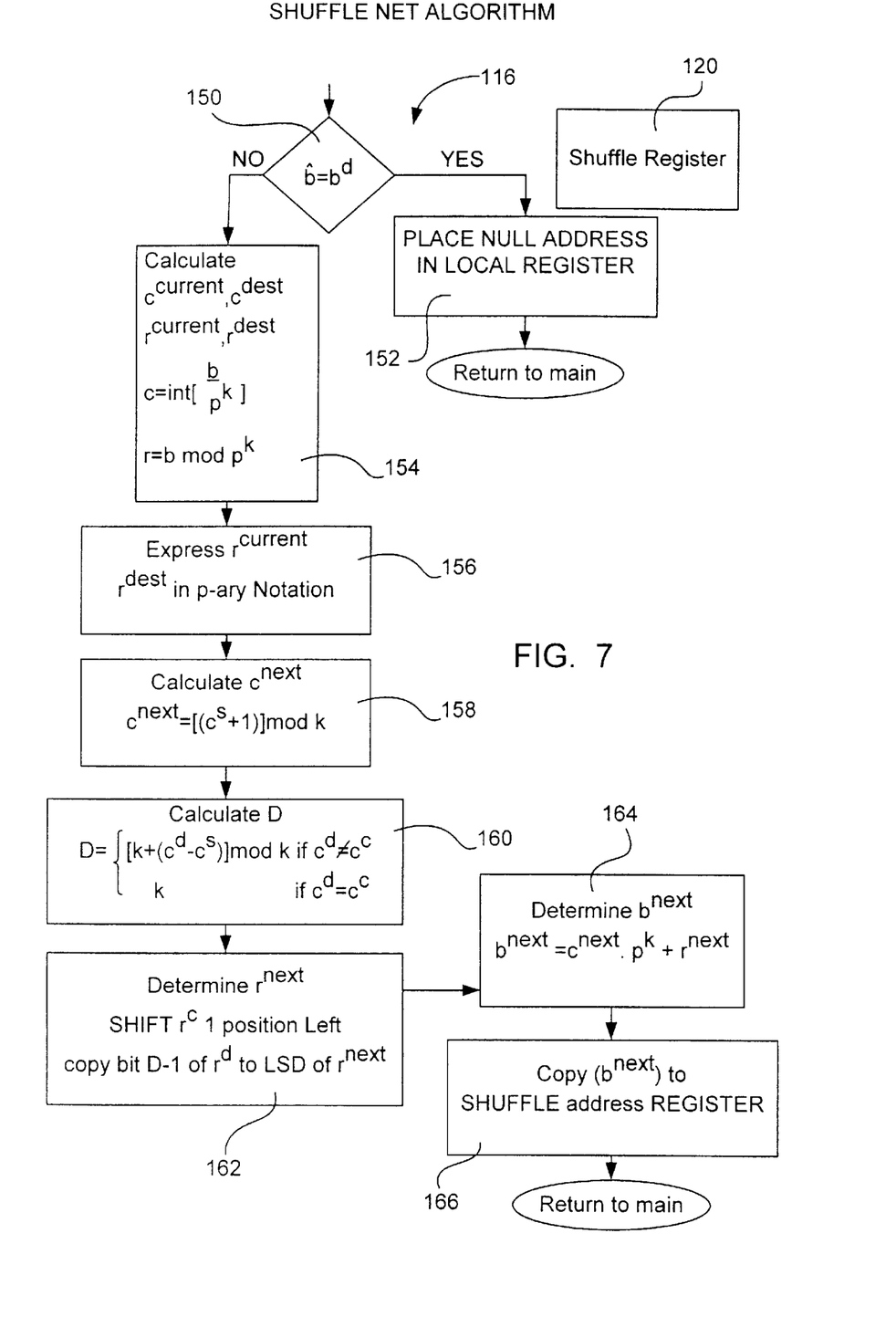
FIG. 7 is a flowchart representing a shuffle net algorithm according to the first embodiment of the invention.

Referring to FIG. 7, part two of the adaptive routing algorithm is shown generally at 116. Part two includes a first subroutine 150 which includes instructions for directing the processor to act as an address determiner for determining whether or not the shuffle address component ($b^d$) of the destination address is equal to the shuffle address component ($\acute{b}$) of the address of the current node. If the above condition is true, processing is directed to subroutine 152 which includes instructions for directing the processor to place a null address in the shuffle register 120. Upon completing subroutine 152, the second part 116 of the adaptive routing algorithm is completed and processing returns to the main algorithm (shown in FIG. 5).

Still referring to FIG. 7, in the event that the shuffle component ($\acute{b}$) of the current node is not equal to the shuffle component ($b^d$) of the destination node, the processor is directed to determine the shuffle component of the next node according to conventional techniques for determining the next node in a shuffle network.

Briefly, these techniques include calculating constants "c" and "r" for the current node and for the destination node, where "b" is the node number of the current and the destination nodes respectively, "p" is the degree of output (in this case 2) and "k" is the number of columns (also in this case 2), according to the relations.

$$c = \text{int } [b/p^k]$$

$$r = b \bmod p^k$$

After having determined "c" and "r" for the current and destination nodes, subroutine 156 includes instructions for directing the processor to express the "r" for the current node and the destination node in p-ary notation in this case, since p equals 2, these values would be expressed in binary notation.

Subroutine 158 then directs the processor to calculate a ($c^{NEXT}$) determined by the function:

$$(c^{NEXT}) = [c^s + 1] \bmod k,$$

where ($c^s$) is equal to the "c" relating to the current node as determined in subroutine 154.

Next, a further subroutine 160 directs the processor to calculate a new constant D, according to the following function:

$$D = \begin{cases} k + (c^d - c^s) \bmod k & \text{if } c^d \neq c^c \\ k & \text{if } c^d = c^c \end{cases}$$

Next, subroutine 162 determines an ($r^{NEXT}$) value by shifting the r current value one position to the left and copying bit D−1 of the r associated with the destination address ($r^d$) to the least significant digit of the $r^c$ representation.

Next, subroutine 164 directs the processor to determine a ($b^{NEXT}$) value according to the following function:

$$b^{NEXT} = c^{NEXT} \cdot p^k + r^{NEXT}$$

Finally, subroutine 166 directs the processor to copy the ($b^{NEXT}$) value calculated in subroutine 164 to the shuffle address register. The second part 116 of the adaptive routing algorithm is thus completed and processing continues at subroutine 168 in FIG. 5.

Continuing with Main Adaptive Routing Algorithm

Referring back to FIG. 5, after previous portions of the adaptive routing algorithm have loaded the ring and shuffle registers respectively, subroutine 168 includes instructions which direct the processor to determine which, if any, of the ring and shuffle registers 118 and 120 has a null value as would be provided by subroutine 124 in FIG. 6 or subroutine 152 in FIG. 7. In the event that the ring register 118 contains a null value, subroutine 170 copies the ring address component ($\acute{a}$) of the current node and the shuffle address component ($b^{NEXT}$) held in the shuffle register 120 to respective positions of a next destination buffer 121. Similarly, if shuffle register 120 holds a null value, subroutine 170 causes the contents of the ring register 118 ($a^{NEXT}$) and the shuffle component ($\acute{b}$) of the current node address to be copied to the next destination buffer. The next destination buffer thus holds the ring address component and shuffle address component of the next node to which the data packet is to be transferred, in the case where either the ring address component of the destination node is that of the current node or where the shuffle address component of the destination node is equal to that of the current node. Subroutine 172 then correlates the address specified by the next destination buffer 121 with the outputs 34, 36, 42 and 44 and determines which output is associated with that address and directs the CPU 92 of to cause the associated packet filter 70 to load the packet into the corresponding output buffer 72–78. The lookup table (Table 1) associating possible next addresses and outputs on which data must be sent to reach such addresses is used to establish the correlation mentioned above. Thus, where the ring address component of the destination address is equal to the ring address component of the current node, and the shuffle address components differ, the data packet will be transmitted on the shuffle network and where the shuffle address component of the destination address is equal to the shuffle address component of the current node, and the ring address components differ, the data packet will be transmitted on the ring network.

Referring back to FIG. 5, in the case where neither the ring register 118 nor the shuffle register 120 contains a null value, the possible next nodes are specified by ($a^{NEXT}$, $\acute{b}$) and ($\acute{a}$, $b^{NEXT}$). The first and second parts of the adaptive routing algorithm, in conjunction with the CPU thus act as a node determiner for determining possible next nodes and the address components of possible next nodes on the ring and shuffle network to which the data packet can be advanced toward the destination node.

Having determined the possible next nodes to which the data packet may be sent, subroutine 174 directs the microprocessor to determine the queue length of the buffer associated with the output associated with the address specified by the ring component ($a^{NEXT}$) in the ring register and the shuffle component ($\acute{b}$) of the current node and to determine the queue length of the output buffer associated with the output associated with the address specified by ring component ($\acute{a}$) of the current node and the shuffle component ($b^{NEXT}$) stored in register 120 and to determine if the queue length of the former is greater than or equal to the queue length of the latter. The next node to which the data packet is to be sent is taken to be the lesser of the two. If the next node is specified by ($\acute{a}$, $b^{NEXT}$) subroutine 176 directs the processor to copy the current ring component ($\acute{a}$) and the contents ($b^{NEXT}$) of the shuffle register 120 into respective locations in the next destination buffer 121 respectively. Subroutine 172 then directs the processor to copy the data packet to the output buffer designated by the contents of the next destination buffer. Similarly, where the lesser of the queue lengths is associated with ($a^{NEXT}$, $\acute{b}$), subroutine 178 causes the processor to copy the contents of the ring register 118 and the shuffle component of the current node address to the next destination buffer 121. Subroutine 172 then directs the processor to determine the associated output and add the data packet to the output buffer defined by the contents of the next destination buffer. The adaptive routing algorithm is thus completed.

Upon completion of the adaptive routing algorithm for a given data packet, the processor is directed to either perform the same algorithm on any further data packets received since the last data packet and which may be awaiting processing.

During processing associated with the adaptive routing algorithm, the processor may simultaneously be executing a transmit routine (not shown), running entirely independently of the adaptive routing algorithm, for controlling the forwarding of data from respective output buffers 72 through 78 to respective modulators 84 through 90 for transmission via outputs 34, 36, 42 and 44 connected to optical fibres forming respective portions of the overall network system.

Operation

Referring to FIG. 1, the shuffle networks are numbered clockwise from above as networks 0, 1, 2 and 3. These numbers act as the respective ring address components of nodes associated with respective shuffle networks. Each of the node 0s in each shuffle network is connected to each other, and similarly the node 1s, node 2s and node 3s.

For the purposes of this discussion, assume that a data packet is received at node 2 in shuffle network 2. In FIG. 1, this node is double-crosshatched and is indicated generally at 180. This node 180, therefore, has an address of (2,2).

Assume now that the destination node to which the data packet is to be sent is node 7 on shuffle network 3. The destination address is thus (3,7). The associated node is numbered 182 in FIG. 1.

Referring to FIG. 5, when the data packet is received at the current node (180 in FIG. 1), subroutine 108 determines whether or not the current node is the destination node. It clearly is not and, therefore, processing continues with the adaptive routing algorithm shown generally at 112 in FIG. 5. The adaptive routing algorithm begins with the first part 114 thereof, shown in FIG. 6.

Figure 8:
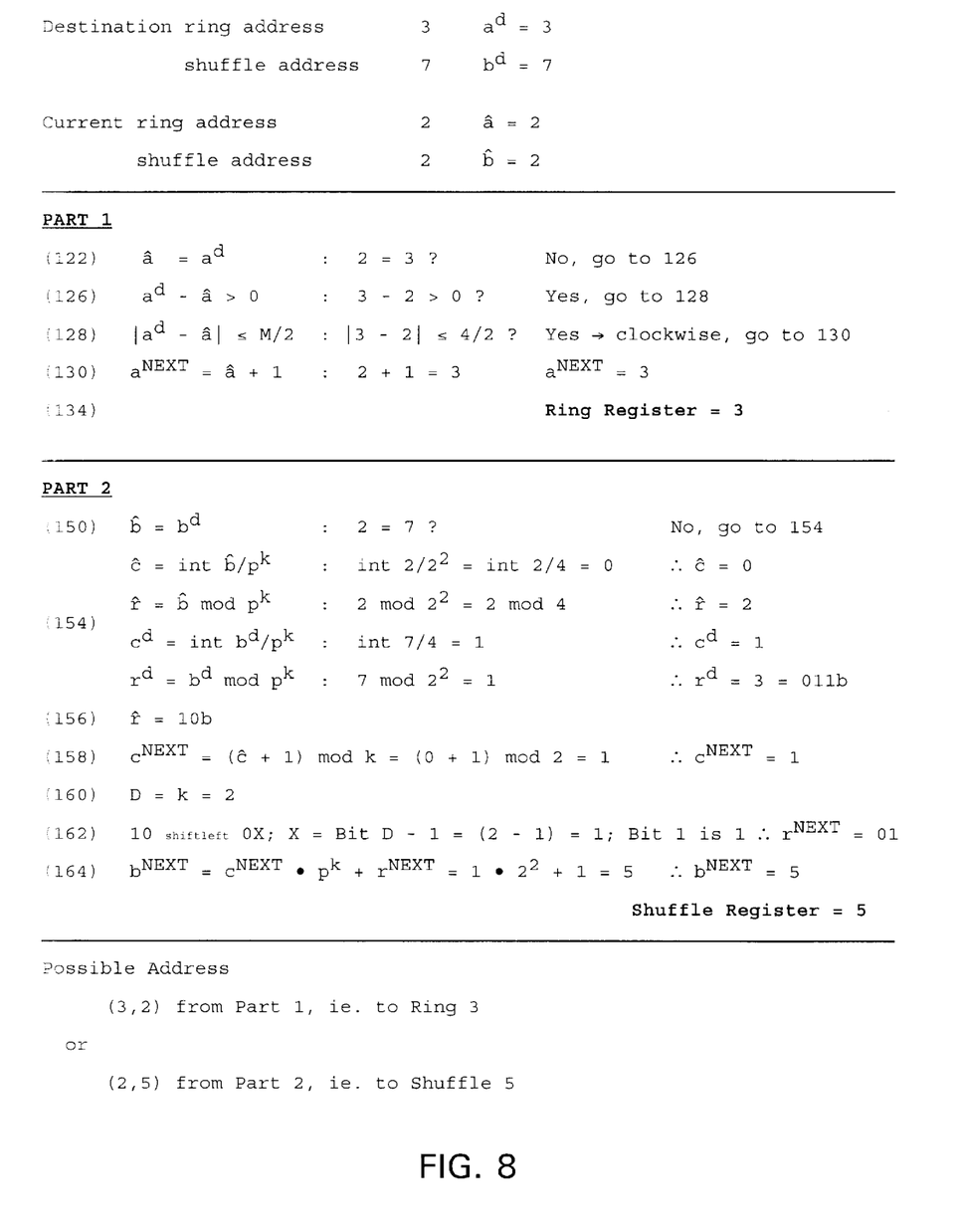
FIG. 8 is a listing of expressions evaluated by subroutines shown in the flowcharts shown in FIGS. 5, 6 and 7.

Referring briefly to FIG. 8, FIG. 8 indicates the outcome of the various subroutines associated with parts 1 and 2 of the adaptive routing algorithm. In FIG. 8, numbers in curved brackets indicate expressions evaluated in the corresponding subroutine designated by the same number in FIGS. 6 and 7.

Referring back to FIG. 6, subroutine 122 determines whether or not the ring address associated with the current node is equal to the ring address associated with the destination node. Using specific numbers, the test is whether or not 2=4 and clearly the answer is no and, therefore, processing continues with subroutine 126. Subroutine 126 determines whether or not the ring component of the destination address minus the ring component of the current address is greater than 0. Using specific number, the test is whether or not (3−2)>0 and clearly the answer is yes in which case processing proceeds with subroutine 128.

Subroutine 128 determines whether or not the absolute value of the difference between the ring component of the destination address and the ring component of the current address is less than or equal to half of the number of nodes on the ring. Using specific numbers, the question is whether or not the absolute value of (3−2)≦(4/2) and clearly the answer is yes and, therefore, the data packet is to be sent clockwise on the ring network shown in FIG. 1.

Processing proceeds with subroutine 130 which determines that the ring component of the next possible ring address is the ring component of the current node address plus 1. Using specific numbers, the result is 2+1=3 and, therefore, $a^{NEXT}=3$.

Subroutine 134 places the value 3 in the ring register 118 shown in FIG. 6.

Processing then continues with the second part of the adaptive routing algorithm which is described in connection FIGS. 7 and 8. Referring to FIG. 7, subroutine 150 determines whether or not the current shuffle net component is equal to the destination shuffle component. Using the specific numbers in this case, it determines whether or not 2=7 which clearly is not true and, therefore, processing proceeds with subroutine 154.

Subroutine 154 calculates constants c and r for the current and destination nodes and referring to FIG. 8, the numbers in this case determine that $c^c$ is 0, $r^c$ is 2, $c^d$ is 1 and $r^d$ is 3. Subroutine 156 expresses this decimal number 3 in binary notation as 10.

Subroutine 158 then determines the value of the constant $c^{NEXT}$ and referring to FIG. 8, this value is determined to be 1.

Subroutine 160 then determines the value of the variable k according to the indicated relations and using the numbers of the present case, D=2.

Subroutine 162 then determines the $r^{NEXT}$ constant which is determined by shifting the $r^c$ value calculated in subroutine 154 one position to the left and copying bit D−1 of the $r^d$ calculated in subroutine 154 to the least significant digit of the $r^{NEXT}$ representation. Referring to FIG. 8, $r^{NEXT}$ is determined to be 01.

Subroutine 164 then determines $b^{NEXT}$ according to the indicated relation and referring to FIG. 8, $b^{NEXT}$ is determined to be 5. Therefore, the value 5 is placed in the shuffle register 120 of FIG. 5.

To summarize, therefore, referring to FIG. 5, after the first and second parts of the adaptive routing algorithm have been completed, the ring register contains the value 3 and the shuffle register contains the value 5.

Processing then proceeds with subroutine 168 which determines that both the ring and shuffle registers contain valid addresses and, therefore, processing continues with subroutine 174.

At this point, the possible next nodes to which the data packet may be sent have the addresses $a^{NEXT}$, $\hat{b}$, ie. 3, 2 and $\hat{a}$, $b^{NEXT}$, ie. 2,5. These two addresses are then located in the lookup table (not shown) to determine the respective outputs associated therewith.

In the lookup table, the $a^{NEXT}$, $\hat{b}$ value corresponding to 3,2 will indicate that the output connected to the clockwise direction on the ring network is the associated output and, therefore, the queue length of buffer 76 in FIG. 3 will be determined by the CPU 92.

Similarly, the lookup table will associate the second shuffle net output shown in FIG. 3 with the address 2,5 and, therefore, the queue length of buffer 74 in FIG. 3 will be determined by the CPU and compared with the queue length of buffer 76.

Referring back to FIG. 5, if the queue length of buffer 76 in FIG. 3 is greater than or equal to the queue length of buffer 74 in FIG. 3 then subroutine 172 of FIG. 5 copies the packet to buffer 74 in FIG. 3, for transmission over the second shuffle net output.

On the other hand, if the queue length of buffer 74 is greater than the queue length of buffer 76 then the data packet is loaded into buffer 76 in FIG. 3 and the data packet is transmitted over the ring network output associated with the clockwise direction.

Where the queue length of buffer 74 is equal to the queue length of buffer 76, the algorithm causes the CPU 92 to randomly select either buffer 74 or buffer 76 to receive the data packet. Alternatively, the algorithm may be defaulted to always select buffer 74 as the receiving buffer or to always select buffer 76 as the receiving buffer.

Referring back to FIG. 1, the possible nodes to which the data packet may be sent from the current node 180 are single cross-hatched and are designated 184 and 186, respectively. Node 184 has the address 2,5 and node 186 has the address 3,2.

Whichever of these two nodes has been deemed to receive the data packet will then process the data packet in the same way as described above to determine the next node to which the data packet is to be sent enroute to the destination node 182.

While the above description describes the invention in connection with a Multi-Dual Ring Connected Shuffle network, the invention has more general application to any multiple network system where each node is common to two distinct networks, particularly where a plurality of first networks link a plurality of second networks. In the embodiment described, the first networks would be the ring networks and the second network would be one of the shuffle networks.

The above invention presents a simple adaptive routing scheme for multi-dual ring connected shuffle networks. This scheme relieves congestion from nonuniform traffic patterns and network failures. The queue sizes of output buffers convey to the processor, information about the loads on outputs of the due to congestion or network failure conditions, node and this information is used to distribute traffic and make channel loads more balanced. A data packet is routed over less busy channels whenever there exists multiple minimum hop routing paths to the data packet's destination. Thus, data packets may be dispersed from congested portions of the network.

The invention provides an apparatus and method for adaptive routing, which is very simple and which requires very little extra processing time as compared to conventional, fixed routing algorithms. Also, the invention eliminates the need for an extra distribution control channel for determining routing, as is commonly used in some centralized routing schemes.

The topology of the multi-dual ring connected shuffle network resembles that of multi-long-distance carriers in a city. A node of a carrier connects to another node of the same carrier in another city, via a ring network. Each carrier may connect its nodes in different locations in a similar way. The connections between different carriers in the same city may be achieved through local networks such as the shuffle networks indicated above. Different carriers can thus share available bandwidth with each other. In this case, the criteria for deciding alternative paths in the adaptive routing scheme could include the cost of leasing a communications medium, combined with queue length or instead of queue length. This may allow a user to find a least expensive route for communication. If a given output from a node is idle, the carrier may lower the cost of this connection to encourage other carriers to utilize the bandwidth. In this way, the bandwidth pool provided by all long-distance carriers can be fully and evenly used by all customers. Thus, the overall cost of traffic is reduced.

Operation

While specific embodiments of the invention have been described and illustrated, such embodiments should be considered illustrative of the invention only and not as limiting the invention as construed in accordance with the accompanying claims.

What is claimed is:

1. A method of routing data packets from a current network node toward a destination node where the current node and the destination node are connected to first and second networks in a multiple network communication system, the method comprising the steps of:
 a) determining the destination node of the data packet;
 b) determining which of a plurality of outputs connected to said first and second networks are suitable to advance the data packet toward the destination node;
 c) determining queue lengths of output buffers associated with respective outputs of said plurality of outputs; and
 d) forwarding said data packet to an output buffer having the least queue length, for transmission over a network to which said output associated with said output buffer is connected.

2. A method as claimed in claim 1 further including the step of determining whether or not the current network node is the destination node.

3. A method as claimed in claim 1 further including the step of determining first and second address components of possible next nodes toward the destination node in the first and second networks.

4. A method as claimed in claim 1 further including the step of determining whether or not first and second address components of a destination address of the destination node are equal to respective corresponding components of the current address and if so, making the data packet available to the current node.

5. A method as claimed in claim 1 further including the step of determining whether or not a first address component of a destination address of the destination node is equal to a first address component of the current node and if so, transmitting the data packet on the second network.

6. A method as claimed in claim 1 further including the step of determining whether or not a second address component of a destination address of the destination node is equal to a second address component of the current node and if so, transmitting the data packet on the first network.

7. A method as claimed in claim 1 further including the step of receiving at one of a plurality of inputs connected to respective networks a data packet addressed to the destination node.

8. A method as claimed in claim 1 further including the step of reading a header portion of said data packet to determine said destination node.

9. A method as claimed in claim 1 further including the steps of:
 a) determining first and second address components of possible next nodes toward the destination node in the first and second networks;
 b) determining whether or not a first address component and a second address component of a destination address of the destination node are equal to respective corresponding components of the current address and if so, making the data packet available to the current node;
 c) determining whether or not the first address component of the destination address is equal to the first address component of the current node and if so, transmitting the data packet on the second network; and
 d) determining whether or not the second address component of the destination address is equal to the second address component of the current node and if so, transmitting the data packet on the first network.

10. A method as claimed in claim 1 further including the step of randomly selecting an output buffer to receive said data packet where the queue lengths of said output buffers are equal.

11. A method as claimed in claim 1 further including the step of forwarding said data packet to at least one of said output buffers when the queue lengths of said output buffers are equal.

12. A method of routing a data packet from a current node toward a destination node in a multi-dual ring connected shuffle network including a ring network and a shuffle network, the destination node having a destination address having a ring address component and a shuffle address component, the method comprising the steps of:
   a) determining the destination node of the data packet;
   b) determining which of a plurality of outputs connected to said ring and shuffle networks are suitable to advance the data packet toward the destination node;
   c) determining queue lengths of output buffers associated with outputs of said plurality of outputs; and
   d) forwarding the data packet to an output buffer having the least queue length, for transmission over the network to which said output associated with said output buffer is connected.

13. A method as claimed in claim 12 further including the step of determining the possible next nodes toward the destination node in the ring network and in the shuffle network.

14. A method as claimed in claim 13 further including the step of determining a preferred direction in which to transmit the data packet over said ring network to advance the data packet toward the destination node.

15. A method as claimed in claim 12 further including the step of determining whether or not the current node is the destination node and if so, making the data packet available to the current node.

16. A method as claimed in claim 12 further including the step of determining whether or not the ring address component of the destination address is equal to a ring address component of the current node and if so, transmitting the data packet on the shuffle network.

17. A method as claimed in claim 12 further including the step of determining whether or not the shuffle address component of the destination address is equal to a shuffle address component of the current node and if so, transmitting the data packet on the ring network.

18. A method as claimed in claim 12 further including the step of determining whether or not the ring address component and the shuffle address components of the destination address are equal to respective corresponding components of the current address and if so, making the data packet available to the current node.

19. A method as claimed in claim 12 further including the step of determining ring and shuffle address components of possible next nodes toward the destination node in the ring network and in the shuffle network.

20. A method as claimed in claim 12 further including the step of receiving the data packet at a current node in said multi-network system.

21. A method as claimed in claim 12 further including the step of randomly selecting an output buffer to receive said data packet where the queue lengths of said output buffers are equal.

22. A method as claimed in claim 12 further including the step of forwarding said data packet to at least one of said output buffers when the queue lengths of said output buffers are equal.

23. An apparatus for routing data packets from a current network node toward a destination node in a multiple network communication system, the apparatus comprising:
   a) a register for receiving a data packet;
   b) outputs connected to respective networks;
   c) output buffers associated with respective outputs, said output buffers being operable to hold respective queues of data packets ready for transmission over respective networks;
   d) a queue length determiner for determining queue lengths of said respective queues of data packets; and
   e) a copier for copying the data packet from said register to an output buffer having the least queue length.

24. An apparatus as claimed in claim 23 further including a node determiner for determining possible next nodes on respective networks, to which the data packet can be advanced toward the destination node.

25. An apparatus as claimed in claim 24 wherein the node determiner is operable to determine whether or not the current network node is the destination node.

26. An apparatus as claimed in claim 23 further including a transmitter for transmitting said data packet on at least one of said networks.

27. An apparatus as claimed in claim 23 wherein the multiple network communication system includes first and second networks.

28. An apparatus as claimed in claim 27 further including an address determiner for determining first and second address components of possible next nodes toward the destination node in the first and second networks.

29. An apparatus as claimed in claim 28 wherein the address determiner is operable to determine whether or not the first address component and the second address component of the destination address are equal to respective corresponding components of the current address.

30. An apparatus as claimed in claim 28 wherein the address determiner is operable to determine whether or not the first address component of the destination address is equal to a first address component of the current node and if so, cause the data packet to be transmitted on the second network.

31. An apparatus as claimed in claim 28 wherein the address determiner is operable to determine whether or not the second address component of the destination address is equal to the second address component of the current node and if so, cause the data packet to be transmitted on the first network.

32. An apparatus as claimed in claim 28 further including a header reader for reading a header portion of said data packet to determine the destination node.

33. An apparatus as claimed in claim 23 further including a central processing unit programmed to perform the functions of said queue length determiner, and said copier.

34. An apparatus as claimed in claim 24 further including:
   a) a central processing unit programmed to perform the functions of the node determiner and programmed to:
      i) determine first and second address components of possible next nodes toward the destination node in the first and second networks;
      i) determine whether or not the first address component and the second address component of the destination address are equal to respective corresponding components of the current address;
      iii) determine whether or not the first address component of the destination address is equal to a first address component of the current node and if so, cause the data packet to be transmitted on the second network; and
      iv) determine whether or not the second address component of the destination address is equal to the second address component of the current node and if so, cause the data packet to be transmitted on the first network.

35. An apparatus as claimed in claim 23 further including a plurality of inputs connected to respective networks for receiving a data packet addressed to the destination node.

36. An apparatus as claimed in claim 33 wherein said central processing unit is programmed to randomly select an output buffer to receive said data packet where the queue lengths of said output buffers are equal.

37. An apparatus as claimed in claim 33 wherein said central processing unit is programmed to select at least one of said output buffers to receive said data packet when the queue lengths of said output buffers are equal.

38. An apparatus for routing a data packet toward a destination node in a multi-dual ring connected shuffle network including a ring network and a shuffle network, the data packet having a ring address component and a shuffle address component, the apparatus comprising:
   a) a register for receiving said data packet;
   b) outputs connected to the ring and shuffle networks respectively;
   c) output buffers associated with respective outputs, said output buffers being operable to hold respective queues of data packets ready for transmission over said ring network and said shuffle network respectively;
   d) a queue length determiner for determining queue lengths of said respective queues of data packets; and
   e) a copier for copying the data packet from said register to an output buffer having the least queue length.

39. An apparatus as claimed in claim 38 further including a node determiner for determining possible next nodes on the ring network and on the shuffle network to which the data packet can be advanced toward the destination node.

40. An apparatus as claimed in claim 39 wherein the node determiner is operable to determine a preferred direction in which to transmit the data packet over said ring network to advance the data packet toward the destination node.

41. An apparatus as claimed in claim 39 wherein the node determiner is operable to determine whether or not a current node is the destination node and if so, make the data packet available to the current node.

42. An apparatus as claimed in claim 38 wherein a current node has a ring address component and a shuffle address component.

43. An apparatus as claimed in claim 42 further including an address determiner for determining whether or not the ring address component of the destination address is equal to the ring address component of the current node and if so, causing the data packet to be transmitted on the shuffle network.

44. An apparatus as claimed in claim 42 further including an address determiner for determining whether or not the shuffle address component of the destination address is equal to the shuffle address component of the current node and if so, causing the data packet to be transmitted on the ring network.

45. An apparatus as claimed in claim 42 further including an address determiner for determining whether or not the ring address component and the shuffle address components of the destination address are equal to respective components of the current address and if so, making the data packet available to the current node.

46. An apparatus as claimed in claim 38 further including an address determiner for determining ring and shuffle address components of possible next nodes toward the destination node in the ring network and in the shuffle network.

47. An apparatus as claimed in claim 46 further including a receive register and wherein the address determiner is operable to determine whether or not the ring component and the shuffle component of the destination address are equal to respective components of the current address and wherein the copier is operable to copy the data packet to the receive register for use by the current node when the ring and shuffle components of the destination address are equal to respective components of the current address.

48. An apparatus as claimed in claim 38 further including a header reader for reading a header portion of said data packet to determine the destination node.

49. An apparatus as claimed in claim 38 further including first and second inputs in communication with the ring network and the shuffle network respectively, for receiving a data packet addressed to the destination node.

50. An apparatus as claimed in claim 38 further including a central processing unit programmed to perform the functions of the queue length determiner and copier.

51. An apparatus as claimed in claim 39 further including:
   a) a central processing unit programmed to perform the functions of the node determiner and programmed to:
      i) determine ring and shuffle address components of possible next nodes toward the destination node in the ring and shuffle networks;
      ii) determine whether or not the ring address component and the shuffle address component of the destination address are equal to respective corresponding components of the current address;
      iii) determine whether or not the ring address component of the destination address is equal to a ring address component of the current node and if so, cause the data packet to be transmitted on the shuffle network;
      iv) determine whether or not the shuffle address component of the destination address is equal to the shuffle address component of the current node and if so, cause the data packet to be transmitted on the ring network.

52. An apparatus as claimed in claim 50 wherein said central processing unit is programmed to randomly select an output buffer to receive said data packet where the queue lengths of said output buffers are equal.

53. An apparatus as claimed in claim 50 wherein said central processing unit is programmed to select at least one of said output buffers to receive said data packet when the queue lengths of said output buffers are equal.

* * * * *